United States Patent [19]

Thorne

[11] Patent Number: 4,793,838
[45] Date of Patent: Dec. 27, 1988

[54] AIR CLEANERS

[76] Inventor: John Thorne, Kingswood House, Woodhouse Eaves, Loughborough, Leicestershire, United Kingdom

[21] Appl. No.: 24,744

[22] Filed: Mar. 11, 1987

[30] Foreign Application Priority Data

Mar. 14, 1986 [GB] United Kingdom ................. 8606395

[51] Int. Cl.$^4$ ............................................. B01D 46/00
[52] U.S. Cl. ........................................ 55/378; 55/302; 55/502
[58] Field of Search ................. 55/302, 502, 378, 379; 210/323.2, 333.1

[56] References Cited

U.S. PATENT DOCUMENTS

| | | | |
|---|---|---|---|
| 3,394,532 | 7/1968 | Oetiker | 55/302 |
| 4,209,310 | 6/1980 | Berkhoel | 55/302 |
| 4,298,360 | 11/1982 | Poll | 55/302 |

FOREIGN PATENT DOCUMENTS

| | | | |
|---|---|---|---|
| 5682370 | 1/1933 | Fed. Rep. of Germany | 55/302 |
| 2218922 | 9/1974 | France | 55/302 |
| 2666000 | 2/1977 | Japan | 55/500 |

*Primary Examiner*—Bernard Nozick
*Attorney, Agent, or Firm*—Wheeler Law Firm

[57] ABSTRACT

An air cleaner (10) comprises a partition (12) mounting a number of filter elements (20) between a dirty air inlet (14) and a clean air outlet (16). The partition (12) is provided with means for supplying clean air to the mountings of the filter elements (20) at a pressure greater than that of dirty air to be filtered so as to prevent the escape of dirty air.

Such an air cleaner is suitable for extracting dust from the atmosphere in factories, or silos to which material such as milk powder or cement is fed in a fluidized state from a tanker.

3 Claims, 5 Drawing Sheets

AIR CLEANERS

DESCRIPTION

1. Technical Field

The invention relates to air cleaners for extracting dust from the atmosphere in factories or silos to which material such as milk powder or cement is fed in a fluidized state from a tanker.

2. Background Art

Such air cleaners commonly comprise a partition between a dirty air inlet and a clean air outlet. The partition mounts a number of filter elements, and the cleaner is provided with means for drawing the dirty air through the filter elements. In use the elements become clogged with particles, and so they are cleaned by injecting a pulse of air at high pressure in a reverse direction, ie from the clean air outlet towards the dirty air inlet. This dislodges the cake of dust from the filter elements, and allows it to fall into a dust collector or back into a silo.

One of the problems, particularly with abrasive dusts, is a tendency to form holes by penetrating the seals between the filter elements and the partitions, and then to erode larger holes.

THE INVENTION

According to the invention there is provided an air cleaner comprising a partition mounting a number of filter elements between a dirty air inlet and a clean air outlet, the partition being provided with means for supplying clean air to the mountings of the filter elements at a pressure greater than that of dirty air to be filtered so as to prevent the escape of dirty air. The partition may itself be hollow so that the clean air can be supplied along its inside, or a plenum may be provided on the partition around the mouth of each filter element.

The air cleaner may comprise a housing of its own, or be made an integral part of a factory or silo into which the filter elements hang down. Some of the powders filtered are valuable in themselves, and should not be wasted, while on the other hand the filter elements take up what might otherwise be storage space.

DRAWINGS

BEST MODE

Figure 1:
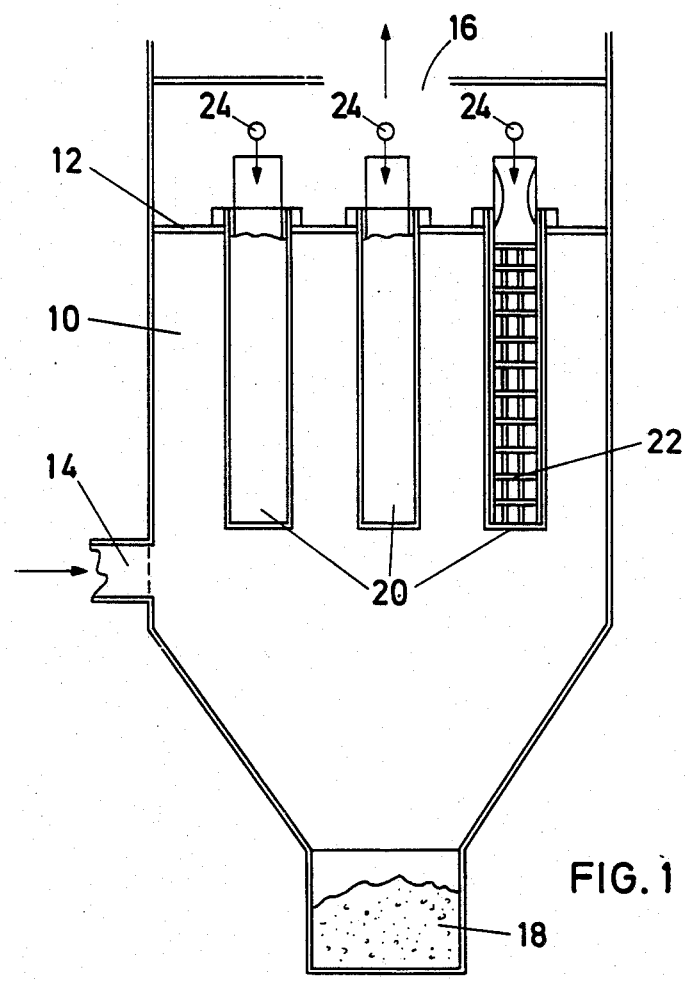
FIG. 1 is an upright sectional general arrangement of an air cleaner according to the invention.

With particular reference to FIG. 1, an air cleaner 10 comprises a partition 12 between a dirty air inlet 14 and a clean air outlet 16. At the bottom is a dust collector 18. The partition 12 has clamped therein a number of elongate filter bags 20 each supported on a cage 22. For ease of illustration, only three bags 20 are shown, but in practice at least five would be used to mitigate the momentary effect of reverse gas flow for cleaning as explained below. The cages 22 extend upward through the partition 12 and provide a passage for clean air escaping to the outlet 16. In use, the filter bags 20 become obstructed with a cake of dust, and this is removed in order to ensure continued effective filtration.

Above the upward-opening mouths of the filter bags 20 and cages 22, tubes 24 extend along the mouths of the filter bags 20 and cages 22. The tubes 24 are each connected through a diaphragm valve 40 (FIG. 1a) to an air reservoir 42 for the supply of pulses of air at high pressure to one of the tubes 24 at a time, in a manner known in itself, for cleaning the filter elements. In the throats of the cages 22, there are venturis to enhance the effect of the high pressure cleaning air by inducing an additional volume of air.

Figure 1A:
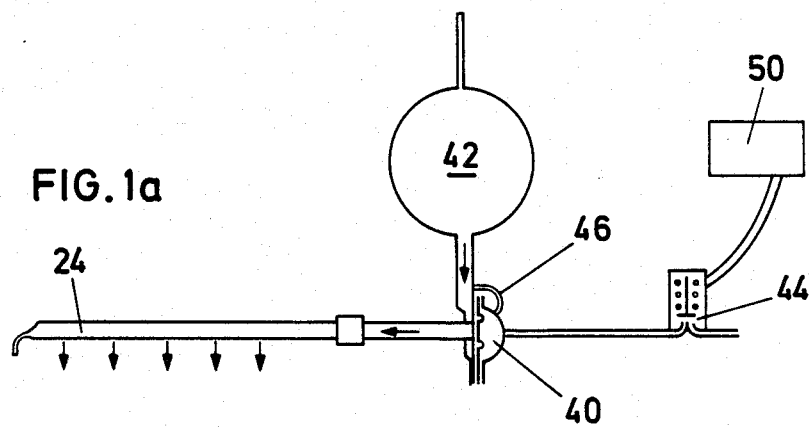
FIG. 1a is a diagram of the compressed air supply to the air cleaner of FIG. 1.

The compressed air supply diagram of FIG. 1a shows how each tube 24 is sealed at an outer end and provided with a number of holes through which air is supplied to one of the individual filter bags 20. A solenoid valve 44 is opened for about 60 milliseconds at a time to release pressure over the diaphragm valve 40. The valve 40 opens and allows a short blast of air from the reservoir 42 to discharge into the tube 24. A pressure equalizer tube 46 over the diaphragm valve 40 then closes the valve 40 owing to the flow side having an effective area less than the other side. An electric timer circuit 50 opens the solenoid valve 44 connected to each tube 24 in a sequence so that only one tube 24 is open at a time.

Figure 2:
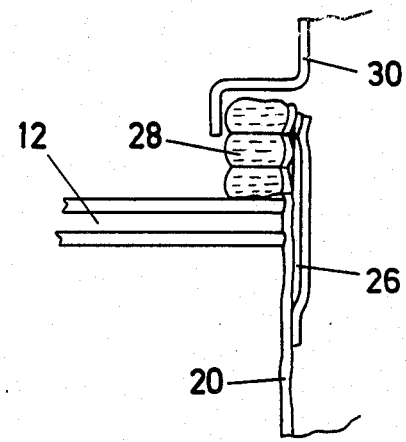
FIG. 2 is a detailed upright section through a part of the cleaner of FIG. 1 showing the mounting of a filter element.

Turning now to FIG. 2, it can be seen that the partition 12 in fact comprises twin plates with a hollow between. The cage 22 is omitted for clarity, but the details include a spring steel band 26 in the filter medium and encircling the mouth of the bag 20, a felt ring 28 sewn around the mouth of the bag 20, and a venturi 30 which helps in clamping the felt ring 28 to the partition 12.

Clean air is supplied to the hollow at a pressure greater than that of the dirty air to be filtered. Atmospheric pressure is greater than both that of the clean air and the dirty, so the tendency is for atmospheric air to flow into all parts of the cleaner, and to prevent the escape of dirty air particularly. Clean air rather than dirty passes through the seals and there is no tendency to erose holes. If the supply of clean air should fail, for example due to blockage, the seal between the partition 12 and the felt ring 28 or clean air space would supplement that between the partition 12 and the dirty air space, and so help to prevent the escape of dirty air.

Figure 2A:
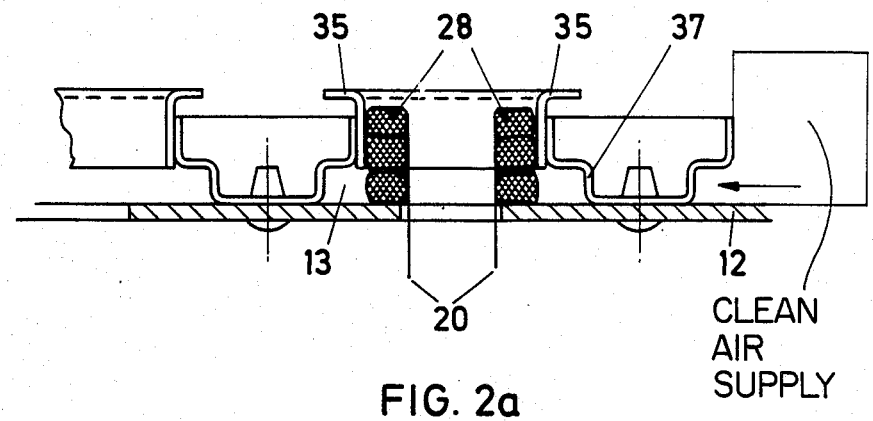
FIG. 2a is an alternative arrangement for the part of the cleaner shown in FIG. 2.

In the alternative of FIG. 2a, the partition 12 is solid. Clean air is supplied through a fail-safe way 13 above the partition 12 and between a lower pressing 37 and the partition 12. The lower pressing 37 forms an air tight joint with an upper pressing 35.

Figure 2B:
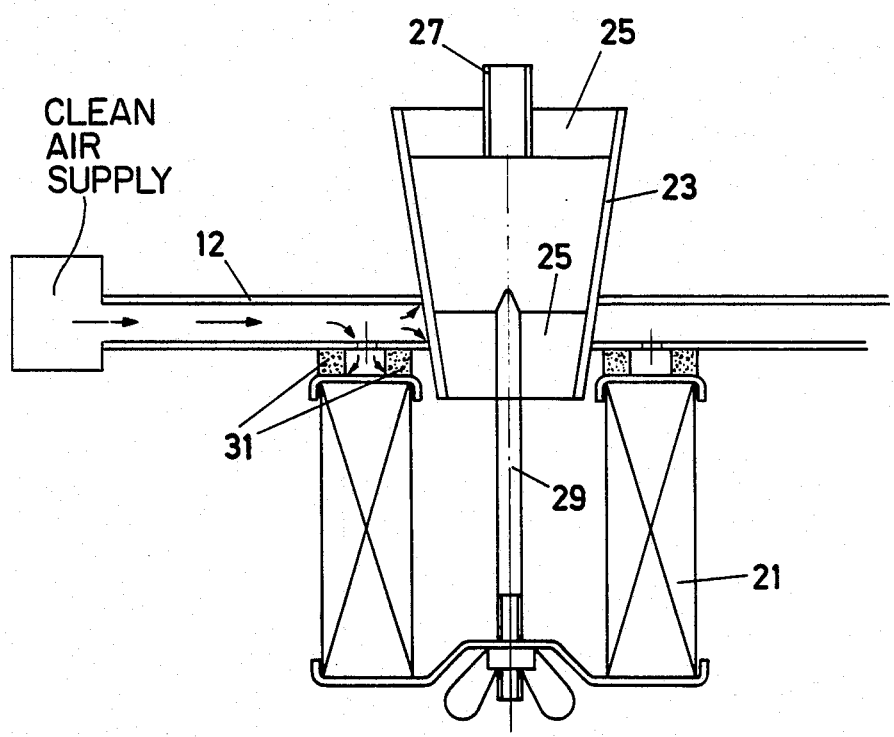
FIG. 2b is yet another arrangement showing a mounting for a cartridge filter element.

The arrangement of FIG. 2b shows a cartridge filter element 21 mounted on the partition 12. The cartridge filter 21 comprises a pleated-paper filter medium held in a perforated metal frame. A static region cone 23 is welded to both plates of the partition 12. The cone 23 has transverse spokes 25 welded across at top and bottom respectively supporting a tube 27 for receiving a pulse of cleaning air and a bolt 29 for securing the cartridge filter 21. The spokes 25 may alternatively be replaced by upright fins of sheet metal having upper and lower projections welded respectively to the tube 27 and bolt 29. Between the top of the filter 21 and the partition 12 are two concentric sponge seals 31 between which an annular gap is connected through bleed holes to the hollow between the plates of the partition 12.

Figure 3:
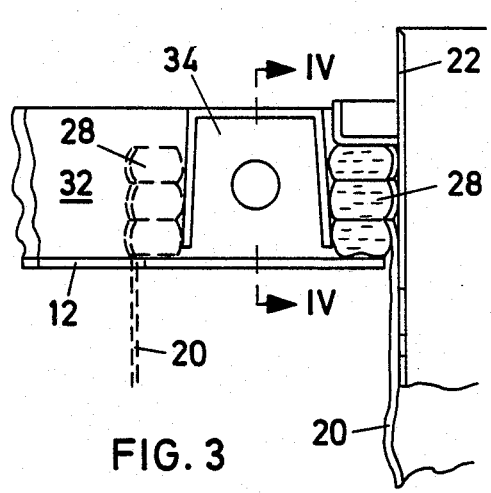
FIG. 3 is a similar detailed upright section through a part of the cleaner of FIG. 1 showing an alternative mounting of the filter element.
Figure 4:
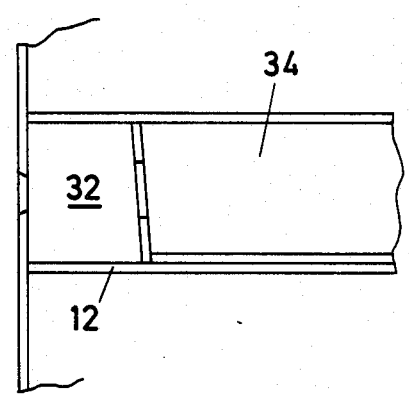
FIG. 4 is a detailed upright section perpendicular to and on IV—IV of FIG. 3.

In FIGS. 3 and 4, an end plenum 32 and side plenum 34 provide a duct for clean air. The side plenum 34 helps stiffen the partition 12 through being connected intermittently along its length.

Figure 5:
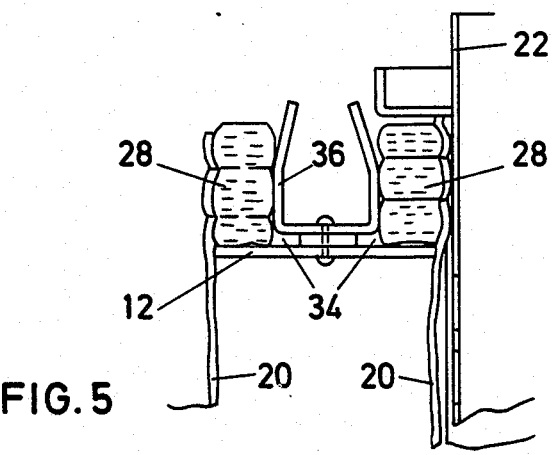
FIG. 5 is a section similar to FIGS. 2 and 3 showing another mounting of a filter element.

In FIG. 5, a channel 36 between sides of adjacent felt rings 38 defines a plenum 34 above the partition 12. The channel 36 stiffens the partition 12 so that it does not distort when the cage 22 is clamped downwards into position. In both cases, the side plenum 34 will stiffen the felt ring 28.

Figure 6:
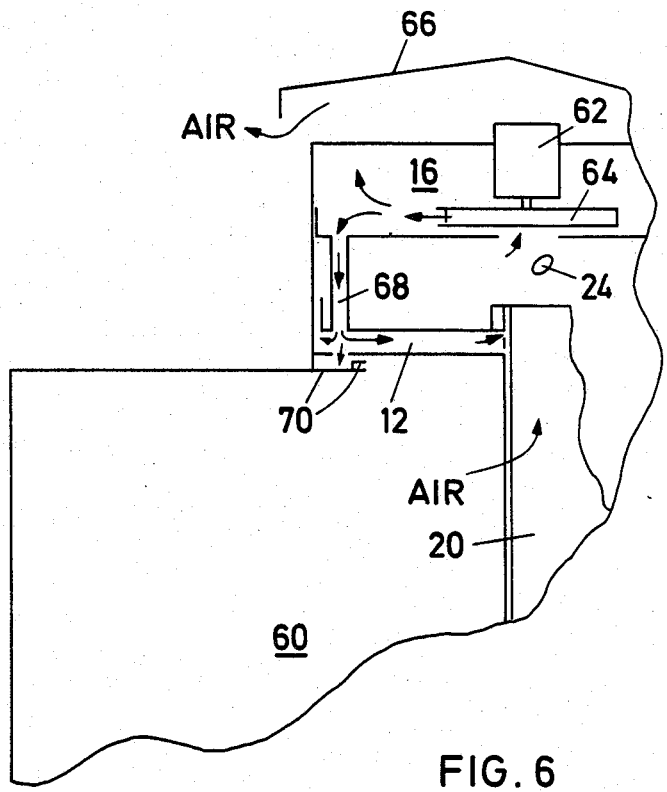
FIG. 6 is a similar section showing a detailed construction for an edge of a plenum in the cleaner of FIG. 1.
Figure 7:
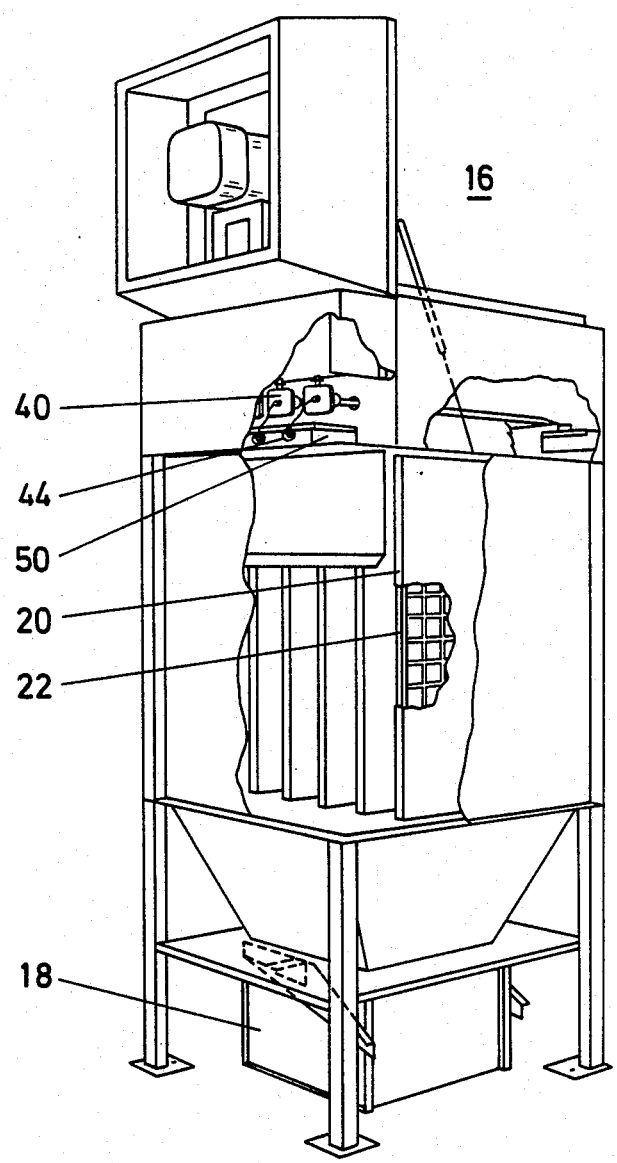
FIG. 7 is an isometric view of an air cleaner as in FIG. 1 in a housing of its own shown with a fan cowl at the top in an open or inoperative position for ease of illustration.

In FIG. 6, the filter bag 20 is shown hanging down into a silo 60, and arrows show the paths taken by the air. At the air outlet 16, a motor 62 drives an exhaust fan 64 under a cowl 66. Clean air passes down a tube 68 into the partition 12. The partition 12 and the air cleaner as a whole are supported on a two-part seal 70 over the silo 60.

I claim:

1. An air cleaner comprising means defining a dirty air space, a clean air space, and a partition carrying at least one filter element separating said dirty air space and said clean air space, mounting and sealing means for each filter element sealing said element to said partition, said partition being provided with means for supplying clean air to the mounting and sealing means of each said filter element at the clean air space side of said mounting and sealing means at a pressure greater than that of dirty air to be filtered, whereby to create a positive pressure at the clean air space side of each said mounting and sealing means so as to prevent the escape of dirty air.

2. An air cleaner according to claim 1 in which said partition is hollow, the means for supplying clean air including the hollow interior of said partition so that the clean air can be supplied along its inside.

3. An air cleaner according to claim 1 in which said means for supplying clean air comprises a plenum on the partition around each filter element open to said mounting and sealing means.

* * * * *